(12) United States Patent
Knappe et al.

(10) Patent No.: US 10,005,036 B2
(45) Date of Patent: Jun. 26, 2018

(54) MODULAR MEMBRANE HOUSING, MEMBRANE HOUSING ELEMENTS AND METHOD FOR THE PRODUCTION THEREOF

(76) Inventors: Holger Knappe, Malataverne (FR); Nils Knappe, Malataverne (FR)

( * ) Notice: Subject to any disclaimer, the term of this patent is extended or adjusted under 35 U.S.C. 154(b) by 251 days.

(21) Appl. No.: 12/736,420

(22) PCT Filed: Apr. 8, 2008

(86) PCT No.: PCT/EP2008/002772
§ 371 (c)(1),
(2), (4) Date: Oct. 7, 2010

(87) PCT Pub. No.: WO2009/124559
PCT Pub. Date: Oct. 15, 2009

(65) Prior Publication Data
US 2011/0031176 A1 Feb. 10, 2011

(51) Int. Cl.
*B01D 63/00* (2006.01)
*B01D 65/00* (2006.01)
(Continued)

(52) U.S. Cl.
CPC ............. *B01D 63/00* (2013.01); *B01D 65/00* (2013.01); *B29C 70/72* (2013.01); *B29D 23/001* (2013.01);
(Continued)

(58) Field of Classification Search
CPC ...... B01D 63/00; B01D 65/00; B01D 65/006; B01D 2313/54; B01D 2313/23; B01D 2313/20; B01D 2313/06; B01D 2313/02; B01D 2313/025; B29C 70/68; B29C 70/72; B29C 70/82; B29C 53/58; B29C 53/581; B29C 53/583; B29C 63/24; B29C 65/02;
(Continued)

(56) References Cited

U.S. PATENT DOCUMENTS 3,006,680 A 10/1961 Gregory
3,504,796 A * 4/1970 Bray .............................. 210/137
(Continued)

FOREIGN PATENT DOCUMENTS

DE 3639932 6/1988
DE 20316956 2/2004
(Continued)

OTHER PUBLICATIONS

International Search Report in corresponding PCT application PCT/EP2008/002772, mailed Dec. 11, 2008, 2 pages.

*Primary Examiner* — David C Mellon
(74) *Attorney, Agent, or Firm* — Nash and Titus, LLC

(57) ABSTRACT

The object of the invention relates to membrane housing elements that are constructed from an inner element, a fiber wrapping, and a casing, and to a method for its manufacture. Due to their structure, the membrane housing elements provide a high pressure resistance with respect to both radial and axial loading. The continuous manufacturing method allows the manufacture of a large number of piece numbers with high precision and uniformity. The membrane housing elements are used for membrane housings in the application fields of nanofiltration, ultrafiltration, ion exchange, and reverse osmosis.

18 Claims, 4 Drawing Sheets

(51) Int. Cl.
*B29C 70/72* (2006.01)
*B29D 23/00* (2006.01)
*B29C 53/58* (2006.01)
*B29C 63/24* (2006.01)
*B29L 23/00* (2006.01)

(52) U.S. Cl.
CPC .......... *B01D 2313/20* (2013.01); *B29C 53/58* (2013.01); *B29C 63/24* (2013.01); *B29L 2023/22* (2013.01)

(58) Field of Classification Search
CPC . B29D 23/001; B29D 99/006; B29L 2023/22; B29L 2031/7154; B29L 2031/7156; B32B 1/02; B32B 1/08; B32B 17/04; B32B 19/045
See application file for complete search history.

(56) References Cited

U.S. PATENT DOCUMENTS

| | | | |
|---|---|---|---|
| 3,654,967 A | | 4/1972 | Atwell et al. |
| 3,872,014 A | * | 3/1975 | Schell ............................ 210/232 |
| 3,931,670 A | | 1/1976 | Arnold |
| 3,962,096 A | * | 6/1976 | Ishii et al. ................ 210/321.83 |
| 4,202,377 A | | 5/1980 | Harrison |
| 4,218,317 A | * | 8/1980 | Kirschmann ............... 210/416.3 |
| 4,522,716 A | * | 6/1985 | LaValley ....................... 210/210 |
| 4,687,026 A | | 8/1987 | Westman |
| 4,990,248 A | * | 2/1991 | Brown et al. ................. 210/136 |
| 5,096,584 A | * | 3/1992 | Reddy et al. ............ 210/321.74 |
| 5,230,437 A | | 7/1993 | Kelly |
| 5,232,593 A | * | 8/1993 | Pedersen et al. ........ 210/321.78 |
| 5,425,877 A | * | 6/1995 | Knappe ...................... 210/493.4 |
| 8,141,590 B2 | | 3/2012 | Knappe |
| 2010/0032043 A1 | | 2/2010 | Knappe |

FOREIGN PATENT DOCUMENTS

| | | |
|---|---|---|
| EP | 0104958 | 4/1984 |
| EP | 0442457 | 8/1991 |
| EP | 0601301 | 6/1994 |
| WO | WO 2004/057230 | 7/2004 |
| WO | PCT/EP2006/009346 | 2/2010 |

* cited by examiner

MODULAR MEMBRANE HOUSING, MEMBRANE HOUSING ELEMENTS AND METHOD FOR THE PRODUCTION THEREOF

BACKGROUND OF THE INVENTION

This application is a 371 national filing claiming priority from international application PCT/EP2008/002772, filed Apr. 8, 2008, and the entire contents of that international application are incorporated herein by reference.

The object of the invention relates to membrane housing elements that are constructed from an inner element, a fiber wrapping, and a casing, and to a method for their manufacture.

The preparation of potable water, and water purification are becoming increasingly important. Usually, hyperfiltration also referred to as reverse osmosis, or nano- and ultrafiltration is used for the preparation of potable water by desalting sea water and by purifying brackish water. To carry out the osmosis or for the filtration of water and other liquids, membranes in the form of membrane elements are frequently used. Usually, spiral membranes are used here, where the membrane film is wound around the permeate tube. These wound membrane elements are inserted in a pressure resistant housing, which withstands the usual operating pressures, namely pressures of the order of magnitude of 16-100 bar. The usual membrane housings, as used in sea water or brackish water desalting installations, accommodate several membrane elements that are arranged in rows and interconnected. The membrane housings for reverse osmosis here present lengths of, for example, 1-7 m, and they have diameters that are suitable for receiving 2.5, 4, 8 and 16 inch membrane elements. In nano- and ultrafiltration in particular, the sizes vary as a function of the given area of application. A membrane element that can be used for reverse osmosis is known, for example, from EP 0 601 301 B1.

The requirements that are placed on the membrane housings in which the membrane elements are introduced are demanding due to the pressure load. In contrast to pressure pipes, for example, membrane housings must be able to withstand greater forces, because the operating pressure is 16-84 bar for the reverse osmosis process, for example. In addition, the cylinder of the membrane housing must absorb the forces of the closed head ends, which are superposed on the radial pressure particularly in the end areas. In contrast to the pressure pipes, the membrane housing therefore must also present high precision, so that the membrane element can be inserted into the membrane housing. For membrane housings, the manufacturing tolerances are thus substantially lower, and the housings must present a nearly circular cross section and the same diameter at every place along the axis. To achieve this high precision, membrane housings have been manufactured largely manually to date with calibrated steel mandrels or using calibrated inner liners.

A corresponding method is known, for example, from EP 0 422 457 B1. The method described there has the following course, for example:

a. The prefinished inner liner pipes are sawed to the desired length and mounted on a support mandrel.

b. The elements that have been sawed to size are then clamped on a machine, which rotates the inner liner uniformly. A polyamide-soaked glass fiber is applied manually to the pipe, while the latter rotates mechanically. The pipe then rotates until several completely covering layers have been built up, with the carriage moving back and forth. The glass fiber-containing mass is hardened on the inner liner. The hardening is carried out either by UV light or in an oven, over several hours under rotation. Once the membrane housings have hardened, the ends are trimmed and polished.

c. In an additional step, the polyamide composition is coated optionally with a UV hardening polymer composition, to produce a visually appealing casing.

Although this method leads to membrane housing elements that present a nearly identical diameter over the entire membrane housing length, and no ovalities, this method allows the manufacture of only a comparatively small number of pieces per day. Because the method presents several steps that have to be carried out manually, it is also comparatively cost-intensive. The numerous work steps entail much manual work, and they are also very time consuming because of the complicated handling of the heavy and bulky parts. Moreover, the individual work stations take up much space for the transport and the storage of the parts.

In addition, during the manufacture of the corresponding membrane housings, one must ensure that the internally located pipe which comes in contact with the desalted water does not contain any substances that are a health threat, and could be washed out of the pipe. In addition, the entire housing must not allow the passage of light and UV radiation, because the latter can potentially foster the growth of algae or bacteria.

The manufacturing methods available to date require, moreover, that the tubular membrane housings must be manufactured in different lengths and diameters as a function of the application purpose and site of application. Accordingly, many different types and sizes of membrane housings and tubular membrane housing elements that are designed for different pressure levels, lengths, and diameters must be kept in stock.

Simple pressure pipes are used, for example, for gas pipelines or water lines, and therefore buried in the ground. Accordingly, only minimal demands are placed on the optical surface constitution. In contrast, in the case of membrane housings, high demands are placed on optical quality. The surface must be smooth and as uniform as possible, and it must present a visually appealing appearance. Therefore, in the case of membrane housings, in contrast to pressure pipes, an optically high-quality casing is necessary.

SUMMARY OF THE INVENTION

The object of the invention is to provide a membrane housing element that can be manufactured cost-effectively while simultaneously presenting high precision and an appealing external surface. The membrane housing element should, in addition, not allow the passage of light and UV radiation; it should present a light- and weather-resistant external skin, and its interior should consist of a material that is safe from the point of view of health for the food or drinking water sector. The construction of the membrane housing should make it possible to produce membrane housings of the greatest variety with a small number of components. The membrane housing elements should still be easy to install in the membrane housing, while simultaneously providing a pressure resistant sealing of the head ends, and ensuring the absorption of the radial and axial forces generated during pressure loading.

Another problem of the invention is to provide a method by means of which larger quantities of the membrane housing elements can be manufactured cost-effectively and with maximum uniformity, while presenting the very high precision required for membrane housings.

The problem is solved according to the invention by a cylindrical membrane housing element, which is constructed from an inner element made of plastic, a fiber wrapping (fiber-reinforced layer), and a casing, characterized in that
on the inner element a largely radial wrapping made of fibers is applied, as fiber-reinforced layer, and
on the fiber-reinforced layer, the casing is applied, which contains at least two traction elements.

Additional embodiments are the object of the dependent claims or described below.

DETAILED DESCRIPTION OF THE INVENTION

Figure 1:
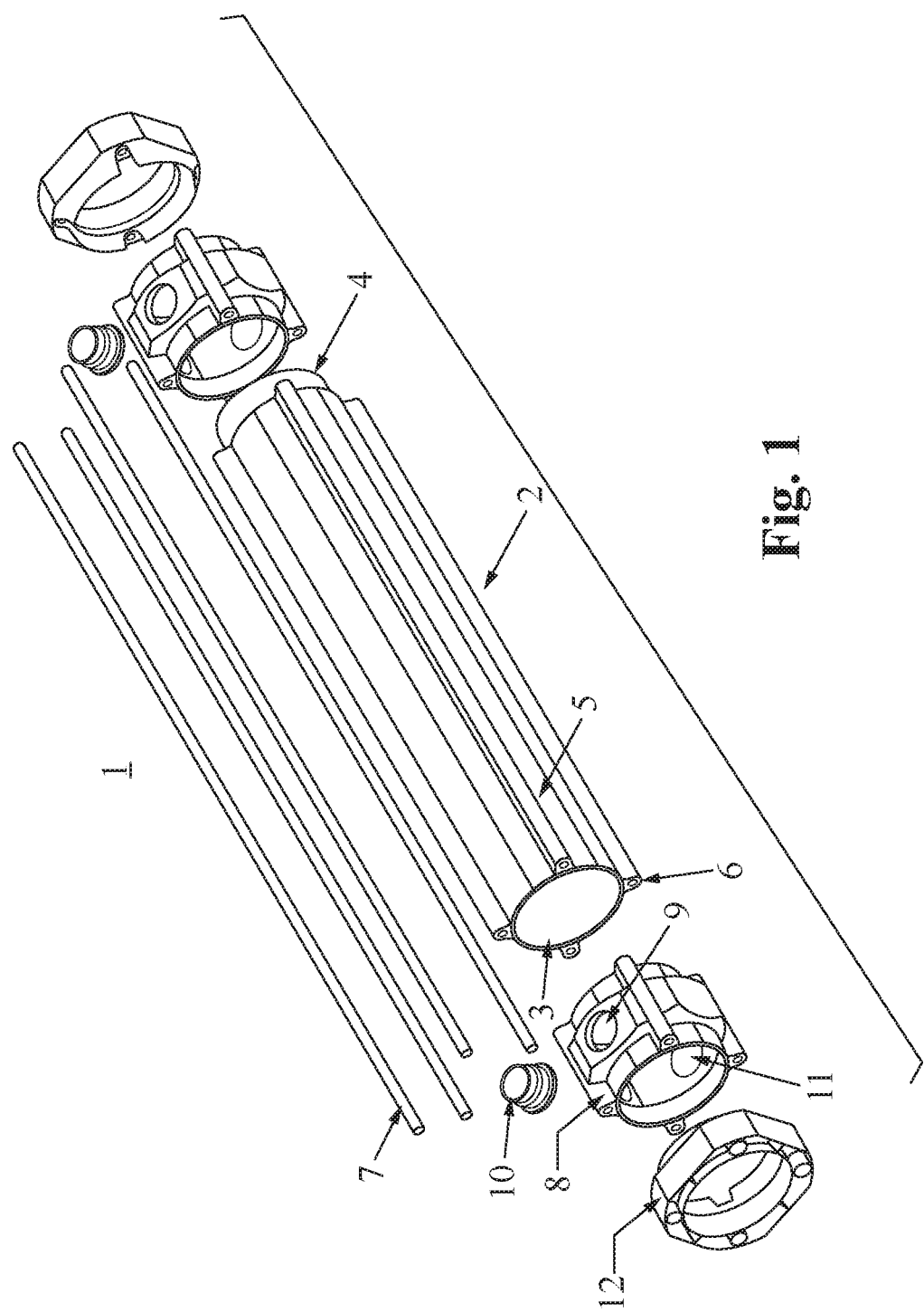
FIG. 1 shows an exploded view of a membrane housing according to the invention.

According to the invention, one uses, as fibers (reinforcement fibers) for the fiber-reinforced layer, mineral fibers, such as, for example, glass fibers, basalt fibers, textile fibers or plastic fibers, or plastic fibers, such as, for example, Kevlar fibers, carbon fibers, polymer fibers or highly cross-linked or coated plastic fibers. The fiber-reinforced layer preferably covers the entire surface of the inner element, i.e., the radial wrapping is applied so that it covers the surface.

The inner element is preferably an inner liner or an inner hollow profile. It is particularly preferred for the inner liner to be extruded, i.e., manufactured from a plastic by the extrusion method. The inner hollow profile is manufactured preferably by the pultrusion method. The pultrusion method, like the extrusion method, is a continuous manufacturing process. In this process, the fibers are first pulled through a bath with a hardenable polymer, for example, a duroplastic polymer, such as, epoxide resins or polyester, and then they are hardened, as they are pulled through, by a heated tool or by a UV hardening. A hollow profile that has been manufactured by pultrusion for the membrane housing elements according to the invention is constructed, for example, from the same fibers as the fiber reinforced layer, where the fibers in the internal hollow profile run along the housing element axis. According to the invention, it is also possible to use other inner elements that have been manufactured by conventional methods, although such elements are less preferred.

The cylindrical membrane housing element is constructed preferably from
an inner liner, which is extruded, i.e., manufactured from a plastic in the extrusion method,
a fiber wrapping with a thermoplastic matrix on the inner liner, which is, for example, a glass fiber reinforced layer with polypropylene coating, and which is held together forming a largely radial wrapping made of fibers, for example, glass fiber bands, with thermoplastic matrix, and
a casing on the fiber-reinforced layer, which is applied by the extrusion method, and which contains at least two traction elements, and head ends, or flange-like structures, that are attached at the end of the housing, for the reception of an end plate system.

In an embodiment, the casing contains hollow bodies in the form of pipe profiles/hollow profiles, which serve for the introduction of the axial traction elements. These pipe profiles also serve for the protection of the traction element from environmental influences. For example, the hollow profiles are included for the reception of the traction elements between the mineral fiber-reinforced layer and the casing. In an additional embodiment, traction elements made of mineral and plastic fibers are also introduced in the manufacturing process of the casing.

The top layer, which is applied for the casing of the membrane housing elements according to the invention, consists preferably of an acrylonitrile-butadiene-styrene rubber (ABS). The casing ensures an optically appealing, uniform surface, to confer an optimal appearance to the membrane housing, and it ensures a good UV resistance. The membrane housing becomes impermeable to light and UV as a result. The casing can also be manufactured from other thermoplasts besides ABS. The casing is preferably a continuous plastic layer with a layer thickness of 2-4 mm.

The traction elements in the membrane housing elements according to the invention are preferably pull rods or traction ropes. The pull rods or traction ropes are preferably made of steel, high-quality steel or a composite material consisting of a fiber with thermoplastic or duroplastic matrix. In a preferred embodiment, four traction elements are used in the membrane housings according to the invention, which elements are arranged particularly preferably at identical separation and parallel to each other to achieve a uniform force distribution. To ensure a uniform casing, it is preferred—for the introduction of the traction elements into the casing—to pull in hollow profiles during the casing process, in which the traction elements are placed. The hollow profiles for receiving the traction elements are enclosed between the fiber-reinforced layer and the casing. They can consist, for example, of extruded plastic. In an embodiment, the casing is replaced by a profile, which already contains the profiles for the introduction of the traction elements, and which is "applied by extrusion" directly on the mineral fiber-reinforced layer during the continuous part of the manufacturing process, in a shaping way.

According to the invention, cylindrical (tubular) membrane housing elements denote tubular structures that are resistant to high pressures and contain, for example, membranes for filtration or osmosis.

The cylindrical membrane housing element according to the invention is manufactured preferably in a procedure that comprises at least the following steps:

1. An inner liner, which is made preferably from PP without glass fiber portion, is manufactured continuously in the extrusion process, and cooled, 2. the cooled liner, while still located in the extrusion line, is heated so that the surface is melted, 3. the molten surface of the liner is then wrapped radially with a glass fiber.

4. After the continuous process, a surface for casing is applied on the glass fiber layer, and, 5. in the process, at least two, preferably four, pull rods which receive the axial force are incorporated in the casing.

The manufacture is carried out, for example, by the following steps:

1. an inner liner, which is made preferably from a polypropylene homopolymer with low viscosity (MFR 0.25 g/10 min), is manufactured continuously in the extrusion process and cooled, 2. the cooled liner, while still located in the extrusion line, is heated so that only the surface is melted, 3. the molten surface of the liner is wrapped primarily radially with a glass fiber with or without thermoplastic matrix, where the fiber becomes hooked with the melt on the liner surface, 4. after the continuous process, a surface for the casing is applied on the fiber layer, and 5. in the process, at least two, preferably four, hollow profiles for traction elements, which are intended to serve for the absorption of the axial forces, are deposited in the casing or the casing profile.

The cylindrical membrane housing element that has been manufactured in this way can then be cut to the desired length.

Later, the pipe heads, i.e., the end pieces with the traction elements, are mounted on the cylindrical membrane housing element according to the invention.

In an embodiment of the invention, thin-walled pipes, as described in EP 0 442 457 B1, are used as inner liner. The inner liners in the cylindrical membrane housing elements according to the invention, or the inner liners that are manufactured in the method according to the invention, consist preferably of polyethylene (PE), polypropylene (PP), polyvinyl chloride (PVC), polyphenylene oxide (PPO), polyamide-modified polyphenylene oxides, a polystyrene-modified polyphenylene oxide, ABS or polyvinyledene fluoride polymers (PVDF) or other thermoplasts.

The problem of the invention is solved furthermore by a method for the manufacture of a cylindrical membrane housing element, which comprises at least the following steps:

1. The continuous manufacture of an inner liner that has been wrapped radially with fibers, where, during the manufacture of the wrapped inner liner, the following steps occur preferably:

a. The inner liner is manufactured by continuous extrusion on an extrusion line, b. then the inner liner is cooled continuously, c. the straight, cooled surface of the inner liner is again heated so that it melts, and, preferably simultaneously, the inner liner is wrapped in its entirety substantially radially with fibers, preferably glass fibers, especially glass fiber rovings or bands that are held together with a PP matrix, and it is connected with the inner liner material, and d. then cooled below the softening temperature of the inner liner, 2. a casing or a casing profile is applied, on the inner liner that is wrapped with fibers, where the casing presents at least two deposited traction elements or hollow profiles for the reception of the traction elements.

In step 1. c., the fibers become connected to the surface of the inner liner by melt connection of the liner material with the fibers or by melt connection of the liner material by the thermoplastic soaking of the rovings.

The casing or the manufacture of the casing profile here occurs preferably in the same section in which the inner liner extrusion and the wrapping are carried out, and also in the continuous manufacturing process. The traction elements that are connected via the membrane housing heads are then inserted in the hollow profiles formed in the casing, provided they are not introduced immediately in the manufacture of the membrane housing. If steel rods are used as traction elements, then the ends of the hollow profiles are sealed in such a way that no corrosion can occur.

In a less preferred embodiment of the invention, the cylindrical membrane housing elements are cut, after carrying out the continuous procedure according to step 1, into pieces of finite length, before the casing is applied.

It is particularly preferred for the tubular membrane housing elements to be cut into pieces having a length of 1-12 m, preferably a length of 12 m. In an embodiment, the traction elements, particularly the fiber bundles, are introduced here between the fiber-reinforced layer and the casing. In an additional embodiment, the hollow profiles can be extruded for the reception of the traction elements directly on the fiber-reinforced layer.

The molten surface of the liner is wrapped radially with a fiber. The fiber is preferably a glass fiber, which is processed to form bands that are glued with polypropylene, where a heating to 230° C. occurs. The special feature of the procedure is that the wrapping with the fibers occurs largely radially, and as a result a high resistance in the radial direction is achieved, without requiring, as in the usual membrane housings, a considerably more expensive, more cost-intensive, and more material-intensive number of crossed layers.

The fibers that are used for the cylindrical membrane housing elements according to the invention or the fibers that are used in the method according to the invention are preferably glass fibers or glass fiber rovings, particularly preferably glass fiber rovings that are glued with thermoplasts, which are processed to form glass fiber bands. The glass fiber layer of these mineral fibers consists of glass fiber rovings, which are preferably preprocessed, presoaked with a thermoplastic "gluing" to form bands. The thermoplastic consists preferably of a material which consists of a thermal glue connection with the material chosen for the use of the inner liner and of the casing.

The force in a pressure pipe acts twice as strongly in the diameter, i.e., in the radial direction, as in the axial direction. Therefore, the largest force acts on the radial wrapping of the membrane housing. In case of internal pressure, the mineral fibers are under a tensile load in the radial wrapping. The usual E glass fibers already have tensile strengths that are 5-6 times greater than those of regular steel, and, as a result, a high tensile load is ensured by the radial wrapping. It is precisely in the case of membrane housings used for sea water desalting, with a typical operating pressure of 84 bar and a safety factor of 6, that the membrane housing according to the invention presents decisive advantages compared to conventional housings with cross wrapping, because here too the required pressure loads are reached with comparatively small wrapping strengths.

Due to the membrane or filter elements that are introduced into the membrane housing elements according to the invention, these elements must be very precise with regard to the inner diameter, and they present only small tolerances of at most +/−0.2 for the inner diameter of 202 mm, respectively +/−0.3 mm for the inner diameter of 406 mm. In addition, no ovality is permissible in the membrane housing elements manufactured according to the invention, because this would lead to serious problems during the insertion and retraction of the membranes/filters. To achieve this precision and uniformity, the extruder is operated at an advance rate of 0.5-1 m per minute during the manufacture of an 8 inch inner liner. This advance rate makes it possible to design, over a short distance, the residence time and pressure of the melt, its cooling, the removal and particularly the calibration of the liner in a stress-free way, so that the membrane housing element no longer undergoes deformation during the subsequent melting of the surface and the wrapping with fibers. It is preferred to melt the surface of the inner liner to a small depth only. In contrast, the line speeds used for the usual pipes are, for example, 5 m and higher per minute.

Using the usual manual procedures, approximately 25 membrane housing elements are ordinarily manufactured, with a length of 6 m, per day (24 h), as a function of the pressure stage at which the housing is to be used. In comparison, the use of the method according to the invention surprisingly allows the manufacture of approximately 120-250 membrane housing elements per day, with unchanged quality and precision.

Another object of the invention relates to a side port membrane housing element, which is constructed from an inner element, for example, an inner liner, which is wrapped with fibers, preferably glass fibers, and from an injection molded casing, characterized in that
the inner element is a plastic element, which is wrapped exclusively radially with fibers, preferably glass fiber rovings, as described above, and
at least two traction elements are inserted between the injection molded casing and the fiber reinforced layer.

The side port element according to the invention is integrated either in a separate pipe head/flange or designed as a separate element. In the classic membrane housings, for lateral line entry, perforations are drilled into the housing wall, which has been reinforced beforehand for that purpose. The side port element according to the invention therefore allows greater flexibility of use without any corresponding reinforcement of the membrane housing.

The side port membrane housing element according to the invention corresponds, in its construction, substantially to the cylindrical membrane housing element according to the invention. However, while the cylindrical membrane housing element serves exclusively for the reception of the membrane element, the side port element allows the flow to be applied to the membrane element or filter in the radial direction, or it allows the liquids to flow in and out laterally, and the installation of connection ports. The individual components of the side port membrane housing element, namely the inner liner, the mineral fiber reinforced layer, and injection-molded casing correspond substantially to the description provided for the cylindrical membrane housing elements.

The side port membrane housing element according to the invention is manufactured preferably in a process consisting of the following steps:
Manufacture of the inner liner in the injection molding process,
radial wrapping of the inner liner with mineral fibers, and
manufacture of a casing over the mineral fiber reinforced layer in the injection molding process.

The membrane housing elements according to the invention and side port elements can be assembled to form a membrane housing. A modular membrane housing, into which the membrane is inserted, consists of at least the following membrane housing elements:
one or more cylindrical membrane housing elements according to the invention,
optionally one or more side port membrane housing elements according to the invention,
optionally connection fittings for lateral flow application and removal, ball cock elements, and fittings,
two membrane housing end heads/flanges, which are held together by traction elements, and
at least two uncapping assemblies (self sealing).

The use of the membrane housing element according to the invention advantageously allows the construction of a membrane housing as a modular system. The manufacturing method according to the invention makes it possible to manufacture, in an economically advantageous way, membrane housing elements for two pressure steps, namely housings for up to, for example, 31 bar, and housings for up to 84 bar. Because the cylindrical membrane housing elements can be sawed individually to different lengths, it is no longer necessary to keep membrane housing elements of a great variety of pressure stages and lengths in stock, rather it is sufficient to store pipes having a maximum length of 7 m for two pressure stages. In addition, for the manufacture of the entire membrane housing, in the simplest embodiment, only the connection fittings and uncapping assemblies are now needed, which are identical for the two systems. As a result considerably fewer different parts have to be stored, and the stock on hand can be reduced drastically.

The membrane housing elements according to the invention, and the membrane housing elements that have been manufactured by the method according to the invention have the advantage that the layer thickness of the cylindrical, tubular elements can be varied by the radial wrapping. The radial wrapping leads at the same time to high resistance and stability, because a uniform fiber layer is ensured in all the areas of the membrane housing element. As a result of the radial wrapping, the membrane housing itself can support the total radial force. The absorption of the axial force occurs via the traction elements located in the casing.

The membrane housings according to the invention are used preferably in the application fields of nanofiltration, ultrafiltration, ion exchange, and reverse osmosis/hyperfiltration. For the filtration methods or reverse osmosis, the membrane housings are filled with membrane elements. If the membrane housing end heads/flanges are replaced with injection molded floors, it is possible to produce tanks or containers using the membrane housing elements according to the invention. The latter are filled with appropriate ion exchangers, for example, ion exchange resins, for the ion exchange.

The invention is explained using examples in the figures.

The central element of the membrane housing 1 according to the invention is, as can be seen in FIG. 1, the cylindrical membrane housing element 2. The latter presents, as innermost layer, an inner liner 3 and an underlying fiber-reinforced layer 4. The casing 5 is placed around the fiber-reinforced layer. In the casing 5, hollow profiles 6 can be seen at the four corners. They serve for the reception of the pull rods 7. At both ends of the membrane housing element 2, side port elements 8 are shown. The openings 9 for the reception of the side ports 10 are located in the side port elements. Next to the openings, there are notches 11, which are distributed over the periphery of the side port element 8, and which can be drilled open, and serve for the reception of additional side ports. The membrane housing 1 is provided, furthermore, with two flanges/membrane housing end heads 12, on which the four pull rods 7 are attached. The end caps for closing off the membrane housing are not shown here.

Figure 2:
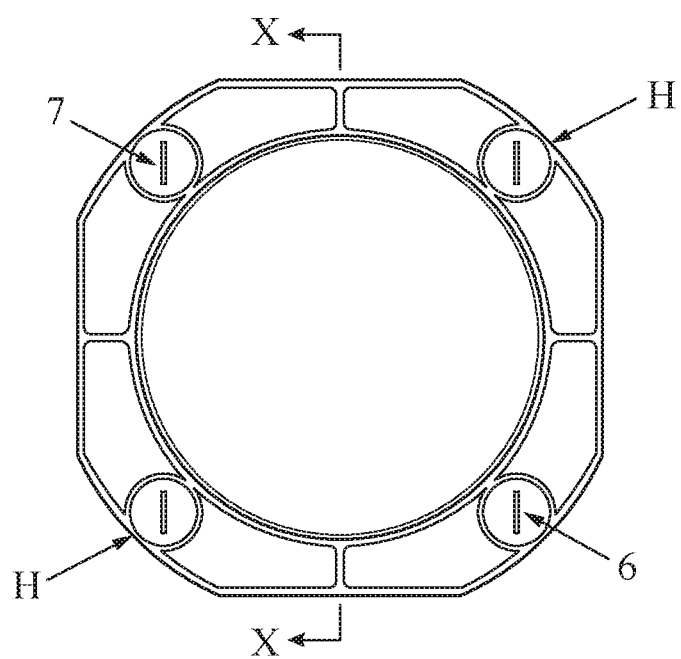
FIG. 2 shows a top view of the diagonal side of the membrane housing from FIG. 1 in the area of the flange, and FIG. 3 a, b shows longitudinal sections through the membrane housing from FIG. 1.

FIG. 2 shows a top view of the side of the membrane housing 1 in the area of the flange 12. The four pull rods 7 are located in each case in the hollow spaces of the hollow profiles 6.

Figure 3A:
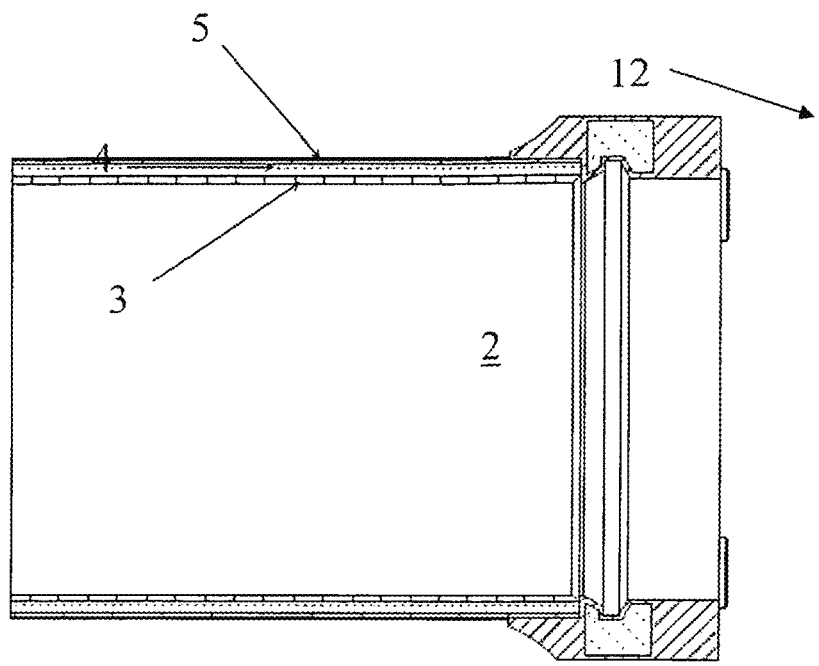
Figure 3B:
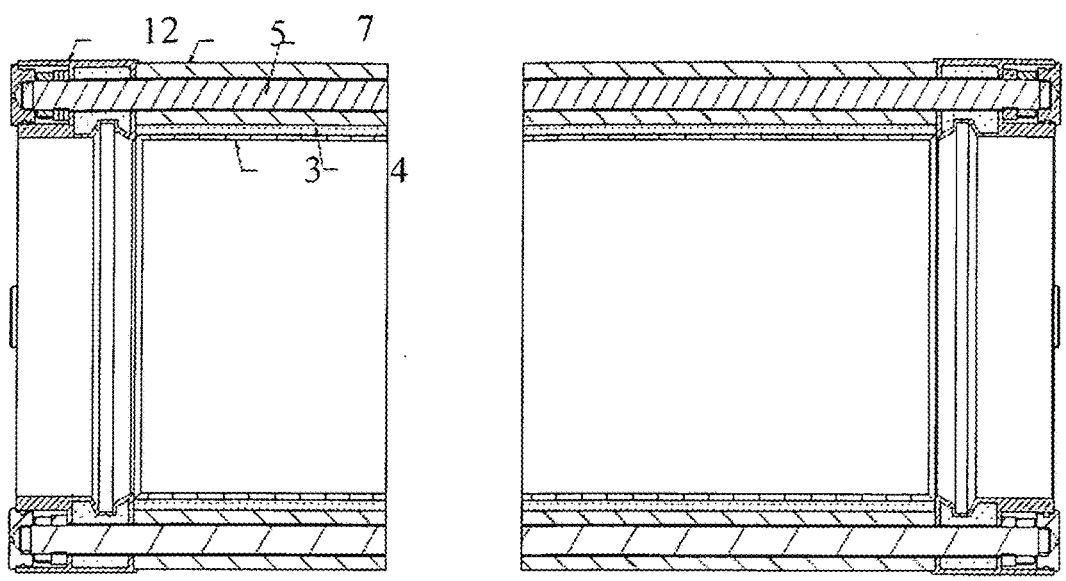

FIG. 3a shows a longitudinal section through the membrane housing along the X-X axis, as shown in FIG. 2. In the middle area, the cylindrical membrane housing element 2 is located, which is constructed from the inner liner 3, the fiber reinforced layer 4, and the casing 5. In the external area, the membrane housing element ends with the flange 12. An additional longitudinal section through the membrane housing along the H-H axis is shown in FIG. 3b. Above the inner liner 3 and the fiber reinforced layer 4, the casing 5 with the hollow profile 6 is located. The pull rods 7, which run in the hollow profiles 6, are attached in the flange 12, to allow the absorption of the axial traction through the pull rods.

LIST OF PART NUMBERS

1 Membrane housing
2 Cylindrical membrane housing element
3 Inner liner
4 Fiber-reinforced layer
5 Casing
6 Hollow profile
7 Pull rods
8 Side port elements
9 Openings
10 Side ports
11 Notches
12 Flanges/membrane housing end heads

The invention claimed is:

1. Cylindrical housing element adapted to house a separate insertable membrane, which cylindrical element is constructed from an inner element, a fiber wrapping and a casing, characterized in that
the inner element has an outer uniform and solid surface,
the entire outer surface of the inner element is uniformly wrapped radially with a fiber to form a fiber wrapping layer, which fiber wrapping layer may optionally contain thermoplastic matrix,
wherein the fiber wrapping layer is applied directly to the outer surface of the inner element with hardenable polymer which is hardened onto the outer surface thereby to connect the fiber wrapping layer, or the fiber wrapping layer contains thermoplastic which is thermally attached directly to the outer surface of the inner element, and
the casing is applied onto the fiber wrapping layer which casing contains at least two axial traction elements positioned perpendicular to a direction whereby the fiber is wrapped radially.

2. The housing element according to claim 1, wherein the fibers for the fiber wrapping layer are glass fibers, mineral fibers, textile fibers or plastic fibers.

3. A housing element according to claim 2, characterized in that the fiber layer is constructed from glass fibers, and consists of thermoplastic soaked or unsoaked glass fiber rovings.

4. The housing element according to claim 1 characterized in that the inner element is an inner liner or an inner hollow profile.

5. The housing element according to claim 4, characterized in that the inner liner or the inner hollow profile is manufactured by extrusion or by the pultrusion procedure.

6. The housing element according to claim 1 characterized in that the casing contains hollow profiles, in which the at least two axial traction elements are located.

7. The housing element according to claim 1 characterized in that the at least two axial traction elements, or hollow profiles adapted for the reception of the at least two axial traction elements, are enclosed between the fiber layer and the casing, wherein the fiber layer is a reinforced mineral fiber.

8. The housing element according to claim 1, characterized in that the at least two axial traction elements are pull rods, or traction ropes, and/or the housing element contains at least four axial traction elements.

9. A housing element according to claim 8, characterized in that the pull rods are made of metal.

10. A housing element according to claim 8, characterized in that the traction ropes are made of glass, carbon fibers or mineral fibers.

11. The housing element according to claim 1, characterized in that the inner liner is made of polyethylene (PE), polypropylene (PP), polyvinyl chloride (PVC), polyphenylene oxide (PPO), polyamide-modified polyphenylene oxides, a polystyrene-modified polyphenylene oxide, ABS or polyvinyledene fluoride polymers (PVDF).

12. Modular housing, which is constructed from
at least one housing element according to claim 1,
at least two housing end heads/flanges for attachment of the at least two axial traction elements,
at least two sealing assemblies, and
optionally one or more side port elements,
which one or more side port elements is constructed from an inner liner that is wrapped radially with fibers, and a casing, characterized in that the inner liner is a plastic element, which is wrapped radially with fibers, and at least two traction elements are introduced between the casing and the fiber layer, and
optionally connection fittings for lateral flow application and removal, ball cock elements or fittings.

13. A housing or container/tank for nanofiltration, ultrafiltration, ion exchange or reverse osmosis, comprising the housing element of claim 1.

14. The cylindrical housing element of claim 1, which is able to withstand operating pressures up to 84 bar.

15. The cylindrical housing element of claim 1, wherein the fiber wrapping layer contains thermoplastic which is thermally attached directly to the outer surface of the inner element.

16. The cylindrical housing element of claim 1, wherein the fiber wrapping layer is directly applied to the outer surface of the inner element with hardenable polymer which is hardened onto the outer surface thereby to connect the fiber wrapping layer.

17. The cylindrical housing element of claim 1, wherein the hardenable polymer is duroplastic.

18. The cylindrical housing element of claim 1, wherein the fiber wrapping layer contains thermoplastic and is directly connected to the outer surface of the inner element by thermal gluing of the thermoplastic onto the outer surface.

* * * * *